(12) United States Patent
Oster et al.

(10) Patent No.: US 8,134,448 B2
(45) Date of Patent: Mar. 13, 2012

(54) METHOD AND CONTROL AND DATA-TRANSMISSION SYSTEM FOR CHECKING THE INSTALLATION LOCATION OF A SAFETY COMMUNICATIONS COMPONENT

(75) Inventors: Viktor Oster, Blomberg (DE); Joachim Schmidt, Bad Pyrmont (DE); Steffen Horn, Schieder-Schwalenberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 520 days.

(21) Appl. No.: 12/293,457

(22) PCT Filed: Mar. 14, 2007

(86) PCT No.: PCT/EP2007/002235
§ 371 (c)(1),
(2), (4) Date: Aug. 10, 2009

(87) PCT Pub. No.: WO2007/107271
PCT Pub. Date: Sep. 27, 2007

(65) Prior Publication Data
US 2009/0299503 A1    Dec. 3, 2009

(30) Foreign Application Priority Data
Mar. 22, 2006  (DE) .................. 10 2006 013 578

(51) Int. Cl.
| | |
|---|---|
| G05B 23/02 | (2006.01) |
| G08B 29/00 | (2006.01) |
| G08B 19/00 | (2006.01) |
| G08B 21/00 | (2006.01) |
| G08C 19/10 | (2006.01) |
| B66B 1/34 | (2006.01) |
| G06F 11/00 | (2006.01) |
| B60R 22/00 | (2006.01) |
| G05D 11/00 | (2006.01) |

(52) U.S. Cl. .......... 340/3.1; 340/3.4; 340/514; 340/521; 340/686.1; 340/870.11; 187/391; 187/393; 714/48; 701/45; 700/284

(58) Field of Classification Search .................. None
See application file for complete search history.

(56) References Cited

U.S. PATENT DOCUMENTS
4,090,248 A * 5/1978 Swanson et al. ............... 714/48
(Continued)

FOREIGN PATENT DOCUMENTS
DE    38 38 152 A1    5/1990
(Continued)

OTHER PUBLICATIONS
Written Opinion from the PCT International Searching Authority, dated Jul. 13, 2007.
(Continued)

Primary Examiner — George Bugg
Assistant Examiner — Renee Dorsey
(74) Attorney, Agent, or Firm — DeMont & Breyer, LLC

(57) ABSTRACT

A method and also a control and data-transmission system is presented, with which the installation location of at least one safety bus component connected to the control and data-transmission system (10) can be checked.

Figure 1:
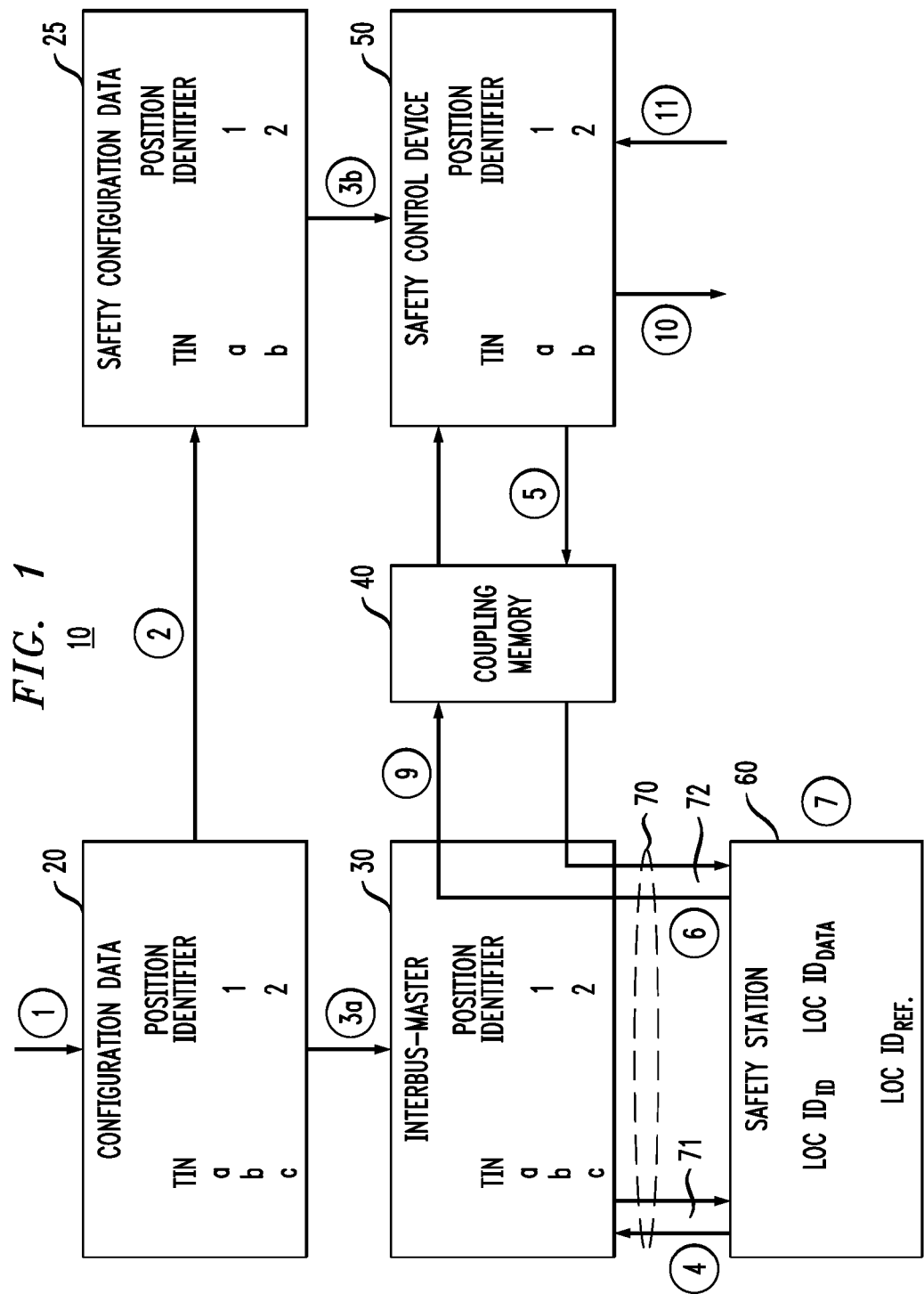

For this purpose, in two separate communications cycles, a respective position identifier, which had been allocated to the safety bus components (60) in a prior configuration process, is transmitted to each safety bus component via a non-safety communications control device (30). The safety bus components compare the position identifiers received in the two communications cycles to the contents of a memory, in which a reference position identifier has already been stored or which is still empty. Based on a comparison of the transmitted position identifier to the reference position identifier and the configuration dataset stored in a safety control device (50), it can be tested whether each safety bus component is connected to the predetermined installation location within the control and data-transmission system (10).

13 Claims, 3 Drawing Sheets

U.S. PATENT DOCUMENTS

| | | | | |
|---|---|---|---|---|
| 5,825,098 A | * | 10/1998 | Darby et al. | 307/10.1 |
| 5,835,873 A | * | 11/1998 | Darby et al. | 701/45 |
| 6,732,839 B2 | * | 5/2004 | Schuster | 187/391 |
| 7,225,972 B2 | * | 6/2007 | Kawamata | 235/375 |
| 7,325,657 B2 | * | 2/2008 | Angst | 187/393 |
| 7,427,916 B2 | * | 9/2008 | Matsumoto et al. | 340/521 |
| 7,640,079 B2 | * | 12/2009 | Nickerson et al. | 700/284 |
| 2001/0048375 A1 | * | 12/2001 | Maruyama et al. | 340/870.11 |
| 2003/0192746 A1 | * | 10/2003 | Suzuki | 187/391 |

FOREIGN PATENT DOCUMENTS

| | | |
|---|---|---|
| DE | 199 34 514 C1 | 2/2001 |
| EP | 1 206 868 B1 | 3/2005 |

OTHER PUBLICATIONS

Yolaine Cussac, "International Application No. PCT/EP2007/002235 International Preliminary Report on Patentability", Dec. 18, 2008, Publisher: PCT.

* cited by examiner

METHOD AND CONTROL AND DATA-TRANSMISSION SYSTEM FOR CHECKING THE INSTALLATION LOCATION OF A SAFETY COMMUNICATIONS COMPONENT

The invention relates to a method for checking the installation location of at least one safety communications component connected to a control and data-transmission system, as well as to a control and data-transmission system that is suitable, in particular, for performing this method.

Control and data-transmission systems today assume a prominent position in industrial production and plant control due to the high degree of automation that is possible. The use of a communications system, by means of which a plurality of decentralized input and output units are connected to a central control device, is very widespread.

For maintaining safety standards in the execution of safety-critical processes, communications systems containing, for example, a CAN bus, Profibus, or INTERBUS in connection with safety-oriented bus components are predominantly used in automation technology. Safety-oriented processes include, for example, monitoring protective screens and protective doors and also controlling two-hand switches and emergency shutdown switches. The bus components connected to such a communications system are also designated below as components or bus components. Safety-oriented bus components are also designated as safety bus components, which can be connected to such a communications system together with non-safety bus components.

For increasing safety, allocating an individual component address, which can be set, for example, directly on the bus component, to a safety bus component, is known in the art.

Furthermore, from EP 1 206 868 B1 a method for the configuration of a safety bus component and also a control system having such a bus component, are known. In the method described in EP 1 206 868 B1, a management unit for issuing component addresses is provided, which is connected to the bus. For the management unit, a special maintenance mode is provided, in which maintenance messages are sent via the bus. When such a maintenance message is received, a user message is sent from a safety bus component to the management unit, which comprises a fixed universal address. If the management unit, in turn, receives such a user message with an included universal address, it sends an address allocation message with a defined component address back to the safety bus component, where this address is stored.

From DE 199 34 514 C1, a method is known for the configuration of a safety bus component connected to a field bus, which transmits a logical and a physical address to the safety bus component from an address allocation unit. The transmitted physical address is verified with reference to an actual physical position of the safety bus component, and the logical address is stored as a function of the verification in a memory of the bus component.

From DE 10 2005 019970 A1, a method for allocating addresses for safety bus components is known, which addresses are advantageously connected to an annular field bus according to the Interbus Standard. The safety bus components have a safety communications layer, also called the Safety-Communication-Layer-Slave (SCLS), in order to be able to generate and exchange safety messages. Furthermore, an Interbus master, to which is allocated a safety control unit with a safety communications layer, also called the Safety-Communication-Layer-Master (SCLM), is connected to the field bus. In order to allow a transmission of safety data between the Interbus master and safety bus components, a connection ID is allocated to the SCLS of each safety bus component. With the help of the connection ID, the SCLM can always communicate with a desired SCLS.

Without using address switches on safety components, however, it is not possible to test reliably, during initial operation as well as at the repeated startup of a control and data-transmission system, whether a safety component is actually connected at the desired installation location of the control and data-transmission system.

Consequently, the present invention is based on the problem of preparing a method, and also a control and data-transmission system, with which reliable checking of the installation location of a safety component is possible at any time.

A core concept of the invention is to be seen in transmitting a position identifier to a safety component in two independent communications cycles and then creating a relationship between the position identifier allocated to the safety component and its installation location in such a way that it can be reliably tested whether the safety component is connected to the installation location that a user has actually also provided for this purpose.

The technical problem mentioned above is solved, first, by the processing steps of claim 1.

Accordingly, a method for checking the installation location of at least one safety component connected to a control and data-transmission system is provided, wherein a non-safety communications control device, to which a safety control device is allocated, is connected to the control and data-transmission system. The non-safety communications control device identifies the position of each connected component in the control and data-transmission system.

In the non-safety communications control device, a first configuration dataset is stored, which contains information on the position of all of the connected components with respect to the control and data-transmission system and an individual position identifier for each safety component. The configuration dataset can be created by a user who wants to design the control and data-transmission system according to his ideas. In other words, the first configuration dataset advantageously reflects the designed construction of the control and data-transmission system. A second configuration dataset is stored in the safety control device. The second configuration dataset contains a list of only the connected safety components and also an individual position identifier for each safety component.

At this point it should be mentioned that, especially for control and data-transmission systems according to the Interbus standard, corresponding configuration tools are known, with which the user can create the corresponding configuration datasets.

After this actual configuration phase, an individual position identifier is transmitted in a first communications cycle from the non-safety communications control device to each safety component connected to the control and data-transmission system. The individual position identifiers contained in the second configuration dataset are transmitted in safety messages from the safety control device to the non-safety communications device. Now, in a second communications cycle, the individual position identifiers contained in the received safety messages are transmitted from the non-safety communications control device to the corresponding safety components. Each of the safety components compares the individual position identifiers received in the first and second communications cycles. If a safety component determines that there is a match between the individual position identifiers, it is tested whether a reference position identifier is already stored in the corresponding safety component. If a reference position identifier is stored in the corresponding safety component, the individual position identifier received in the first or in the second communications cycle is compared to the reference position identifier. If the individual position identifier matches the stored reference position identifier of the corresponding safety component, the safety control device is signaled that the corresponding safety bus component is connected at the predetermined installation location.

Thanks to the transmission of an individual position identifier in two separate communications cycles and the comparison of the received individual position identifiers to a reference position identifier stored in the safety component, it can be reliably tested whether the corresponding safety component is actually connected to the installation location of the control and data-transmission system provided by the user.

Advantageous refinements are the subject matter of the subordinate claims.

The method for checking the installation location of a safety bus component is also suitable, in the first initialization of the control and data-transmission system, for being able to reliably test whether all of the safety components are connected to the installation locations that have been provided by the user in the configuration phase. For this purpose, the individual position identifier transmitted in the first or second communications cycle is stored as a reference position identifier in the corresponding safety component, if no reference location identifier has yet been stored, or alternatively, a predetermined standard reference position identifier has been stored. The safety control device receives, from the corresponding safety component, a safety message that contains information on the fact that the position identifiers transmitted in the first and second communications cycles match and that a reference position identifier has not yet been stored in the corresponding safety component. As a response to the received safety message, the safety control device informs an operator that the position identifiers transmitted in the first and second communications cycles match and that a reference position identifier has not yet been stored in the corresponding safety component. The safety control device then requests the operator to confirm that the corresponding safety component is connected at the predetermined installation location.

Also, during a restart of the control and data-transmission system, it can be reliably checked at any time whether the corresponding safety components are connected at the correct installation locations. For this purpose, when the individual position identifiers received in the first and second communications cycles match, the reference position identifier stored in the corresponding safety component is compared with the individual position identifier. If the reference position identifier does not match the individual position identifier, the reference position identifier is overwritten by the corresponding individual position identifier. Each safety component then sends a safety message to the safety control device, wherein this message contains information on the fact that the individual position identifiers received in the first and second communications cycles do not match the stored reference position identifier. The safety control device can inform the operator accordingly as a response to the received safety message and can request the operator to verify the installation location of the corresponding safety bus component.

So that safety messages can be transmitted between safety components and the safety control device, for example, so-called connection IDs can be agreed upon in advance according to the method described in DE 10 2005 019970 A1 between the safety components and the safety control device.

With the present method for checking the installation location, it is possible to recognize errors in the configuration of the control and data-transmission system, the construction, and the addressing of the control and data-transmission system, and also other user errors. In this way it can be avoided that the control and data-transmission system is damaged and/or operators are injured. For this purpose, the corresponding safety components and/or the control and data-transmission system are moved into a safety state if the operator does not verify that the corresponding safety component is connected at the predetermined installation location or if the corresponding safety component determines that the individual position identifiers transmitted in the first and second communications cycles do not match.

To be able to guarantee that a reference position identifier is stored in the safety component only when the corresponding safety bus component is also connected at the desired installation location, the reference position identifier in the corresponding safety component is replaced by the individual position identifier only when the operator has previously verified that the corresponding safety component is connected at the predetermined installation location.

The method can be applied in an especially advantageous way when the control and data-transmission system has a ring-shaped construction as a field bus according to the Interbus standard. In this case, no component addresses need be allocated to the components, which are connected to the field bus and which are also called bus components. This is because the Interbus works like a shift register, in which the bus components are connected to each other in a ring and form the individual memory positions of the shift register. Due to this special Interbus configuration, the non-safety communications control device can learn the position of all bus components during an identification cycle and/or data cycle, indeed, both with respect to the shift register for ID cycles and also with respect to the position in the shift register for data cycles. If an Interbus is used as the control and data-transmission system, the first communications cycle corresponds to the ID cycle and the second communications cycle corresponds to the data cycle of the Interbus protocol. The individual position identifiers, which are defined for the safety bus components connected to the field bus, are transmitted at the corresponding positions within a summation frame from the non-safety communications device to the corresponding safety bus components.

To be able to reliably apply safety bus components in the first initialization of the control and data-transmission system or in a component exchange to the control and data-transmission system, the serial number stored in the safety bus component and at least one component-specific parameter, in particular, the manufacturer identifier and the device model, are transmitted to the safety control device in at least one safety message. The serial number is added to the second configuration dataset, if the parameters contained in the safety message match the component-specific parameters stored in the safety control device with respect to the corresponding safety component. In this way, each safety bus component is applied to the control and data-transmission system.

The position identifiers to be transmitted in the second communications cycle from the non-safety communications control unit can first be extracted from the safety messages coming from the safety control device and can be embedded in new safety messages and then can be transmitted to the corresponding safety bus component.

In order to be able to meet the safety requirements in safety-critical processes, the present method can ensure that the safety messages, which are transmitted from the safety control device to the non-safety control device and which contain the individual position identifier, are forwarded unread to the corresponding safety components.

The technical problem mentioned above is likewise solved by the features of claim 10.

According to this solution, a control and data-transmission system is provided, which is used, in particular, for carrying out the method according to one of claims 1 to 9.

The control and data-transmission system has a transmission device, to which at least one non-safety communications control device and at least one safety component are connected. The non-safety communications control device recognizes the positions of all of the components connected to a transmission medium. Furthermore, the non-safety communications control device has a memory device for storing a first configuration dataset, which contains information on the position of all of the connected components, that is, safety and/or non-safety components, with respect to the control and data-transmission system and an individual position identifier for each safety component. Furthermore, a safety control device, which has a memory device for storing a second configuration dataset containing a list of only the connected safety components and also an individual position identifier for each safety component, is allocated to the non-safety communications control device. The safety control device is constructed for generating and transmitting a safety message, which contains the individual position identifier of a safety component, to the non-safety communications control device. The non-safety control device is constructed for transmitting individual position identifiers to safety bus components during a first communications cycle and for transmitting the individual position identifiers coming from the safety control device to the safety bus components during a second communications cycle. Each safety component has a memory device for storing a reference position identifier, a device for comparing the individual position identifiers received during the first and second communication cycles, a device for comparing the received individual position identifiers with a reference position identifier, and a device for transmitting a safety message to the safety control device, wherein the safety message contains information on the comparison results. As a response to the safety message received by a safety component, the safety control device can request an operator to verify that the safety bus component is included at the predetermined installation location.

To be able to prevent damage to the control and data-transmission system and also injury to people in case of an error, a device for moving a safety component and/or the control and data-transmission system into a safety state, whenever the operator has not verified that the corresponding safety bus component is connected at the predetermined installation location or if the corresponding safety bus component determines that the individual position identifiers transmitted in the first and second communications cycles do not match.

The safety control device is advantageously connected via a coupling memory to the non-safety communications control device.

Furthermore, a programmable control unit can be provided, which causes the corresponding safety bus components to overwrite the reference position identifier by the individual position identifier as a response to the fact that the individual position identifiers transmitted to a safety component in the first and second communications cycles.

The invention will be explained in more detail below with reference to an embodiment in connection with the enclosed drawings.

Figure 2:
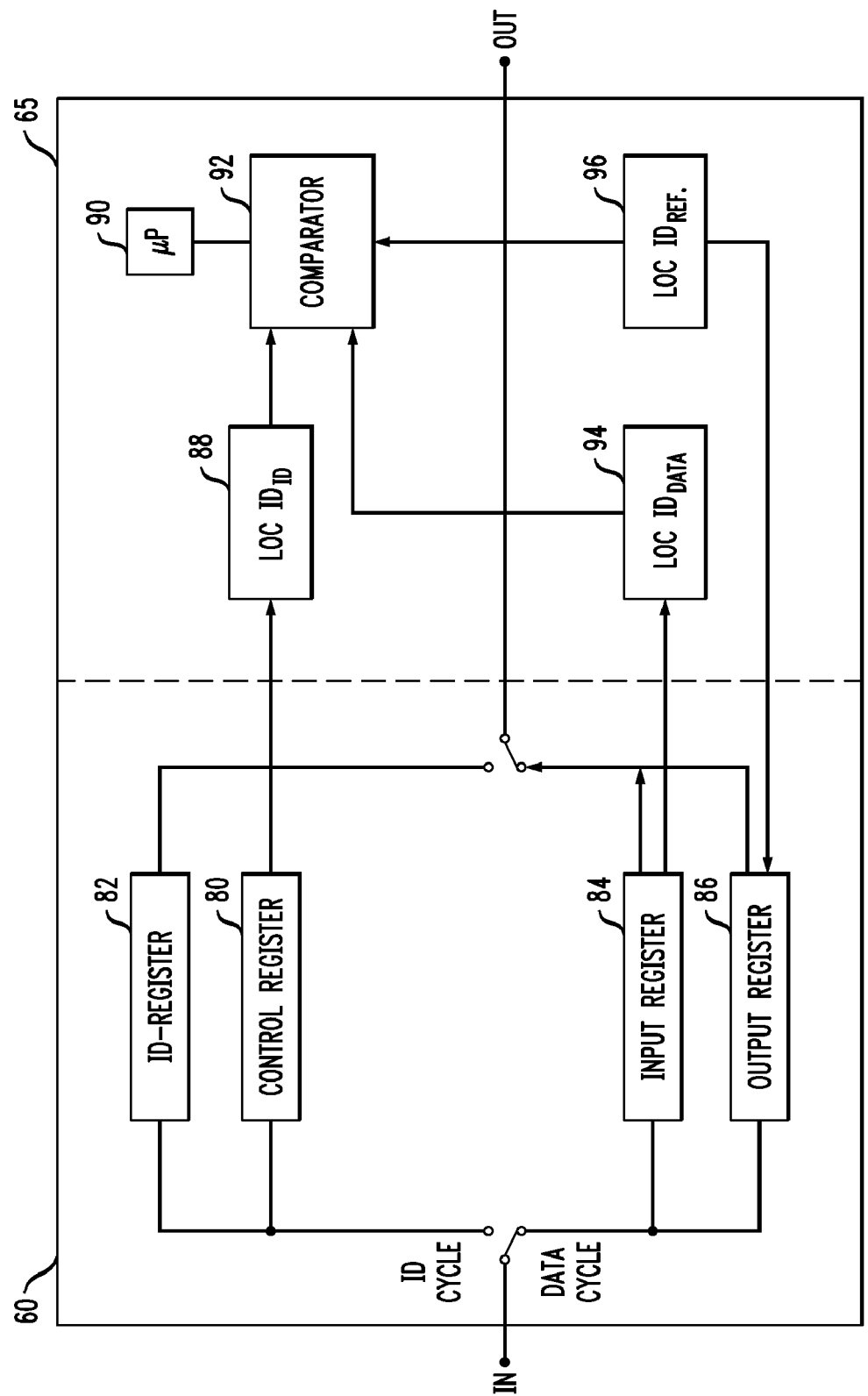
Figure 3:
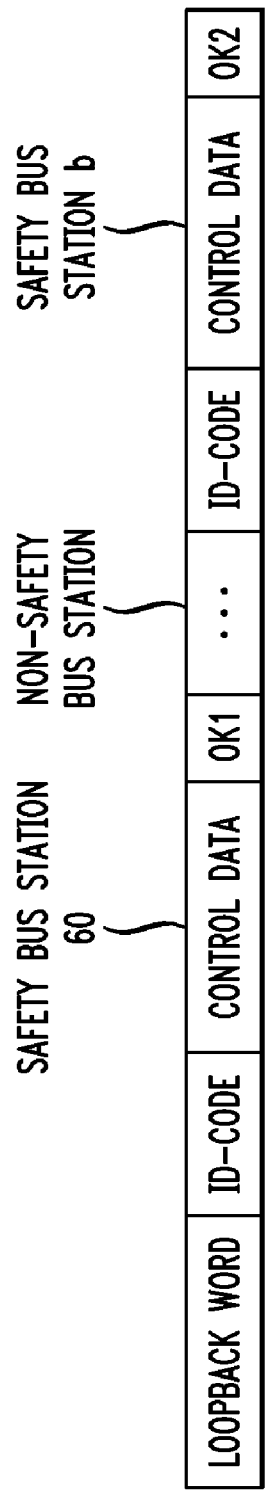
Figure 4:
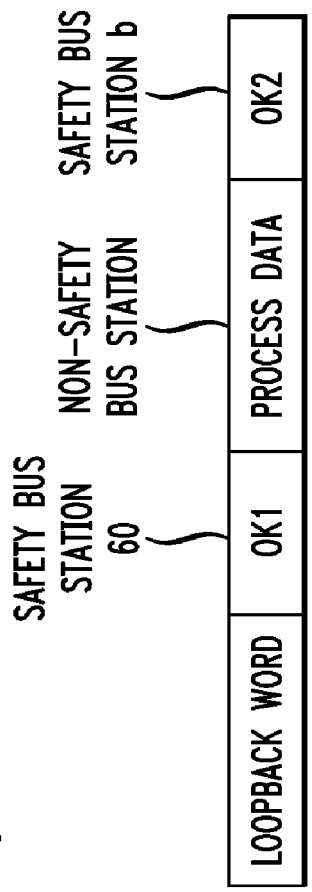

Shown are:

FIG. 1 an example control and data-transmission system, in which the invention is implemented, FIG. 2 a detailed block circuit diagram of the safety sub-component shown in FIG. 1, FIG. 3 a summation frame according to the Interbus protocol transmitted during an identification cycle, and FIG. 4 a summation frame according to the Interbus protocol transmitted during one data cycle.

FIG. 1 shows, in a schematic diagram, a control and data-transmission system designated overall with 10, in which bus components are connected to each other in a ring. In the present example, the control and data-transmission system 10 is an Interbus transmission system, in which the invention is implemented. The Interbus transmission system is described, for example, in the reference book "Interbus-S: Grundlagen und Praxis [Interbus-S: Fundamentals and Practice]" by A. Baginski et al., 1994 Hüthig Buchverlag GmbH, Heidelberg.

The Interbus transmission system 10 shown in FIG. 1 comprises a bus component 30, which functions as a non-safety communications control device, and is called below, for short, Interbus-Master. The Interbus-Master 30 is connected to a field bus 70 of the Interbus transmission system 10 and is connected to a safety control device 50, for example, via a coupling memory 40. The safety control device 50 is a device with a safety communications layer. This is also called SCLM (Safety-Communication-Layer-Master). The safety control device 50 is needed, among other things, to be able control safety-critical processes by means of the non-safety Interbus-Master 30. The field bus 70 is shown symbolically by two rings 71 and 72, which represent, according to the Interbus protocol, a first communications cycle known as an identification cycle and a second communications cycle known as a data cycle. For the sake of simpler representation, only one bus component 60 is shown, which is connected to the field bus 70. The bus component 60 is a safety bus component, by means of which the safety-critical processes can be carried out in connection with the safety control device 50. It should be noted that the safety bus component 60 could be a slave with a safety communications layer, which is also called SCLS (Safety-Communication-Layer-Slave). Obviously, additional safety bus components and also non-safety bus components can be connected to the ring-shaped field bus 70. A software tool, with which a user can configure the Interbus transmission system 10, is shown symbolically with reference symbols 20 and 25.

Because the Interbus transmission system 10 is known to someone skilled in the art, it is sufficient to note that the Interbus is a type of shift register, in which the bus components are connected to each other in a ring shape and form the individual memory locations of the shift register. Based on this shift-register structure for the Interbus, no component addresses are required for the connected bus components. Instead, during an identification cycle, called, for short, ID cycle below, the Interbus-Master 30 learns the positions of the individual bus components in the ring. The arrangement of the bus components in the Interbus is then stored as a process image in the Interbus-Master 30. Thus, the Interbus-Master 30 can send data to each connected bus component, by writing the data intended for the bus components into corresponding positions of a message forming a summation frame, which is sent through the field bus 70. The bus components are in the position to read the data designed for them from the message.

In FIGS. 3 and 4, example summation frames are shown, which are constructed according to the Interbus protocol and which also still contain position identifiers for the corresponding safety bus components.

In FIG. 2, the safety bus component 60 shown in FIG. 1 is shown in more detail. In a known way, the safety bus component 60 has available two shift-register sections. The shift-register section designated with reference symbols 80 and 82 is connected to the field bus 70 during an ID cycle, while the other shift-register section designated with reference symbols 84 and 86 is connected to the field bus 70 during a data cycle. The shift register section in the field bus 70 during the identification cycle has a control register 80 and also an ID register 82. The shift-register section in the field bus 70 during a data cycle has an input register 84 and an output register 86. In the input register 84, the input data coming from the Interbus-Master 30 can be read, while in the output register 86, process data, for example, is stored, which is designed for the Interbus-Master 30. The safety bus component 60 has a section 65, which essentially contains the safety-relevant part of the bus component. However, the selected construction of the safety bus component is to be understood only as an example. The safety bus component 60 has a memory 88 in which, as explained in more detail below, a position identifier can be stored, which is transmitted during an ID cycle from the Interbus-Master 30 to the safety bus component 60. Another memory 94 is provided, in which a position identifier can be stored, which is transmitted to the safety bus component 60 during a data cycle. Furthermore, a memory 96 is provided, in which a reference position identifier can be stored. A comparison device 92 is provided, which can compare the memory contents of the memories 88 and 94 with each other. Furthermore, the comparison device 92 is designed to compare the memory contents of the memory 94 or the memory contents of the memory 88 with the memory contents of the memory 96. A microprocessor 90, for example, takes over the control of the bus component 60 and the comparison device 92. The safety-relevant part 65 of the safety bus component 60 is used in connection with the safety control device 50 to test whether the safety bus component 60 is also actually connected at the installation location of the field bus 70 that a user has provided. At this point, it has already been noted that the microprocessor 90 can ensure that safety messages can be generated, in which predetermined information, such as, for example, "the memory contents of the memories 88 and 94 match," "the memory contents of the memories 88 and 94 do not match," "the memory contents of the memories 88 and 96 match," or "the memory contents of the memories 88 and 96 do not match" is embedded and can be transmitted to the safety control device 50.

Below, the functioning of the Interbus transmission system 10 will be explained in more detail in connection with FIGS. 1 to 4. In particular, it is described how the installation location of the safety bus component 60 in the field bus 70 can be reliably tested.

Initially, during the configuration phase in step 1 according to FIG. 1, the configuration of the Interbus transmission system 10 is set up with the help of the software tool 20. For each bus component that is to be connected to the field bus 70, a configuration dataset for this purpose, is created. Among other things, this dataset contains information on the position of each bus component connected to the field bus 70. In the Interbus transmission system 10 described as an example, the positions of the bus components emerge from the sequence, in which the bus components are stored in the configuration datasets. Furthermore, the configuration datasets contain one individual location identifier for each safety bus component.

In the present example, the bus components a and b are formed as safety components, to which the individual position identifiers 1 and 2, respectively, have been allocated. The bus component c is implemented as a non-safety bus component. Furthermore, it should be mentioned that the bus component a, specified among other things, in the software tool 20 corresponds to the safety bus component 60.

In addition to the position identifier, the configuration dataset of each safety bus component a and b advantageously also contains the associated device model and also the manufacturer identifier. At this point it should be mentioned that in each safety bus component connected to the field bus 70, the serial number is also stored in addition to the device model and the manufacturer identifier.

In step 2 according to FIG. 1, the configuration datasets belonging to the safety bus components a and b are now transmitted to the safety programming environment 25. The safety bus components are listed here in the configuration datasets in a sequence that corresponds to the sequence in which the safety bus components are connected to the field bus 70 with respect to each other. Then in step 3a, all of the configuration datasets, which are created in the software tool 20 and which include both the safety and also the non-safety bus components, are stored in the Interbus-Master 30. In step 3b, the configuration datasets of the safety bus components a and b stored in the safety programming layer 25 are written into the safety control device 50.

Based on the configured Interbus transmission system 10, the Interbus-Master 30 knows the physical position of the bus component connected to the field bus 70 both in the shift register for ID cycles and also in the shift register for data cycles. According to the Interbus protocol, the Interbus-Master 30 now creates a summation frame, which is shown as an example in FIG. 3. Conventionally, a so-called loopback word is prefixed to the summation frame, to which the control information fields of the bus components connected to the field bus 70 are connected in a sequence prescribed by the physical position that the Interbus-Master 30 knows for each bus component in the field bus 70. In the present example, let it be assumed that the safety bus component 60 is the last bus component connected in the field bus 70, so that the control information designed for this bus component is arranged immediately behind the loopback word. This control information can contain an ID code, different control data, and the location identifier 1 of the bus component 60. The non-safety bus component c is connected to the field bus 70 directly preceding the bus component 60, so that the control information allocated to it is stored in the following control information field. Because the safety bus component b is the first bus component in the field bus with respect to the communications direction, its control information together with the position identifier 2 is located in the last control field of the summation frame.

In step 4, the summation frame is now transmitted during a first communications cycle 71, which in the present example, is the ID cycle according to the Interbus protocol, to the connected bus components by means of the field bus 70. Each bus component then receives the control information designated for it from the summation frame. Thus, the safety bus component 60 writes the control information, which immediately follows the loopback word, into the corresponding registers 80 and 82, which are shown in FIG. 3. In particular, the position identifier 1 contained in the summation frame is written by the safety bus component 60 into the control register 80.

It should be noted that the position identifier could comprise, for example, 7 bits. Additional bits in the summation frame can characterize the position identifier and therefore ensure that it can be differentiated from other control data.

Depending on the implementation of the safety bus component 60, the individual position identifier 1 can be written from the control register 80 into the memory 88.

Furthermore, for each safety bus component, as a response to the stored configuration datasets, the safety control device 50 generates a safety message, which contains at least the position identifier allocated to the safety bus component. Thus, in the present example, a safety message, which contains the position identifier 1, is generated for the safety bus component 60. Another safety message, which contains the individual position identifier 2, is generated for the safety bus component b. In step 5, the safety messages are transmitted via the coupling memory 40 to the Interbus-Master 30 in the given sequence. According to a preferred embodiment, the Interbus-Master 30 writes the safety messages unread into a summation frame, which is shown in FIG. 4 as an example. The summation frame comprises, in turn, a loopback word, a first data field, which contains at least the position identifier 1 of the safety bus component 60, a second data field, which contains, for example, process data of the non-safety bus component c, and a data field, which contains at least the position identifier 2 of the safety bus component c. The sequence of data fields in the summation frame is fixed, in turn, by the sequence of the bus components connected to the field bus 70. Because the Interbus-Master 30 knows the positions of all of the bus components connected to the field bus 30, it can embed these at the correct positions in the summation frame as a function of the sequence, at which it receives the safety messages from the safety control device 50.

In step 6, the Interbus-Master 30 transmits the summation frame, which contains the safety messages and thus the position identifiers 1 and 2, by means of a second communications cycle 72, which corresponds to the data cycle of the Interbus protocol, via the field bus 70. Each bus component reads the data designated for it into an input register. In the present example, the safety bus component 60 reads the data, which immediately follows the loopback word and which contains the position identifier 1, into the input register 84. The position identifier 1 can then be written from the input register 84 into the memory 94.

In the following, a first scenario is considered, in which the Interbus transmission system 10 is put into operation for the first time. This means that a reference position identifier has not yet been stored in the memory 96. Alternatively, a standard value could be stored in the memory 96, which signals to the microprocessor 90 that the Interbus transmission system 10 has not yet been put into operation.

According to step 7, the individual position identifiers stored in the memories 88 and 94 are fed to the comparator 92, which tests whether the memory contents, i.e., the stored position identifiers, match. If the comparator 92 determines that there is a match between the two position identifiers stored in the memories 88 and 94, the position identifier 1 stored in memory 88 or the position identifier stored in memory 94 can be stored directly in the memory 96 as the reference position identifier.

The microprocessor 90 now generates a safety message, in which, for example, the device model, the manufacturer identifier, and the serial number of the safety bus component 60 are written. In addition, the safety message contains information on the fact that the position identifiers stored in the memories 88 and 94 match. This safety message is written into the output register 86. During another data cycle, the contents of the output register 86 are embedded into a corresponding summation frame, which is then applied in step 8 via the output of the bus component 60 onto the field bus 70 and is transmitted from there to the Interbus-Master 30. The Interbus-Master 30 takes all of the safety messages from the received summation frame and transmits these in step 9 via the coupling memory 90 to the safety control device 50. It should be noted that for an advantageous embodiment of the Interbus-Master 30, the safety messages are forwarded unread to the safety control device 50. With reference to the safety message designated for the bus component 60, the safety control device 50 learns that the position identifiers stored in the memories 88 and 94 match. This means that the safety bus component 60 is connected to the correct installation location within the field bus 70, so that now the safety bus component 60 can be reported to the Interbus transmission system 10. The safety bus component 60 reports in such a way that the serial number contained in the safety message is stored in the safety control device 50. According to step 10, the safety control device 50 can display to a user, on an integrated display, that the bus component 60 is connected and reported at the correct installation location. The safety control device 50 can additionally or alternatively have available an interface, by means of which this information can be transmitted to an external device.

Now a second scenario will be considered. Here let it be assumed that the Interbus transmission system 10 has already been put into operation correctly, so that the reference position identifier 1 is stored in the memory 96 of the bus component 60. Furthermore, let it be assumed that the Interbus transmission system 10 is to be started again after a desired or undesired standstill.

Similar to the explanations with respect to the first scenario, before the startup of the Interbus transmission system 10 during an identification cycle, the individual position identifiers of the safety bus components 60 and b are transmitted from the Interbus-Master 30 in a message built as a summation frame to the corresponding bus components. The safety bus component 60 reads the control information designated for it, including the position identifier, from the message and writes the position identifier into the memory 88. The safety control device 50 in turn generates safety messages, which contain the corresponding position identifiers for the safety bus components 60 and b and transmits these via the coupling memory 40 to the Interbus-Master 30. The Interbus-Master 30 embeds the safety messages at the corresponding positions of a summation frame and transmits the safety messages in a data cycle to the corresponding safety bus components. The safety bus component 60 takes the safety message designated for it from the incoming summation frame and writes the position identifier contained in this message into the memory 94.

In the comparator 92, the contents of the two memories 88 and 94 are now compared with each other.

In a first subordinate case, let it be assumed that the comparator 92 has determined that the memory contents of the memories 88 and 94 match. This means that the position identifiers transmitted in the two separate communications cycles are identical. Thereupon, the comparator 92 compares the reference position identifier stored in the memory 96 with the position identifier stored in the memory 88 or in the memory 94. If the individual position identifier matches the reference position identifier, then it is guaranteed that the safety bus component 60 is connected at the installation location provided for it within the field bus 70. Under the control of the microprocessor 90, a safety message is generated, which contains information at least on the fact that the reference position identifier and the position identifiers stored in the memories 88 and 94 match. In addition, the safety message can contain the manufacturer identifier, the serial number, and/or the device model of the safety bus component 60. The safety message is buffered in the output register 86. During a corresponding data cycle, it is embedded in a summation frame and transmitted to the safety control device 50 via the Interbus-Master 30 and the coupling memory 40. As a response to the safety message, the safety control device 50 signals to the user that the safety bus component 60 has received the same position identifier that matches the stored reference position identifier both in the first and also in the second communications cycle. In this way it is guaranteed that the bus component 60 is connected at the predetermined installation location.

As soon as it is determined that all of the safety bus components are connected at the installation positions designated for them, the Interbus transmission system 10 can start up and process data can be transmitted.

Now let a second subordinate case be assumed, in which the comparator 92 of the safety bus component 60 has determined that the position identifiers stored in the memories 88 and 94 do not match. In this case, the microprocessor 90 ensures that the safety bus component 60 moves into a safety state, generates a safety message that contains at least the device model of the safety bus component 60, and is transmitted to the safety control device 50. As a response to the safety message, the safety control device 50 can inform the user that an error has occurred. The safety control device 50 can then automatically or triggered by the user turn off the entire Interbus transmission system 10 or move it into a safety state.

Let a third subordinate case be assumed, in which the comparator 92 has determined that the position identifiers stored in the memories 88 and 94, do match, but not with the reference position identifier 1 stored in the memory 96. Thereupon, the microprocessor 90 generates a safety message, which advantageously contains the device model, the manufacturer identifier, the serial number of the safety bus component 60, and information that indicates that a system error is present or the safety bus component has been replaced or connected at a different installation location.

As described above, during a data cycle, the safety message is transmitted in a summation frame via the Interbus-Master, the coupling memory 40 to the safety control device 50. As a response to the safety message, in step 10, the safety control device 50 reports to the user that the individual position identifier transmitted to the safety bus component 60 does not match the reference position identifier stored in the memory 96. A reason for this can be found in that the user has either replaced the safety bus component 60 or has connected it to a different position within the field bus 70.

Based on the manufacturer identifier, the device model, and/or the serial number of the safety bus component 60 transmitted in the safety message, as well as the configuration datasets stored in the safety control device 50, it can be tested whether a component has been replaced or whether, among other reasons, a false position identifier has been transmitted to the safety bus component 60.

If the user has actually replaced the safety bus component 60 and if the manufacturer identifier and/or the device model received in the safety message match the configuration dataset stored in the safety control device 50, the user is requested to verify or reject the position identifier change relative to the safety control device 50. If the user verifies the position identifier change, the serial number of the corresponding safety bus component in the configuration dataset stored in the safety control device 50 is overwritten.

According to one embodiment, the safety control device can then transmit a safety message that contains the confirmation notice and, for example, the position identifier, the device model, and/or the manufacturer identifier of the new safety bus component, to the Interbus-Master 30, which then transmits, in another data cycle, the safety message in a summation frame to the new safety bus component. As a response to the safety message, the microprocessor 90 of the new safety bus component ensures that the position identifier stored in the memory 88 or in the memory 94 is taken into the memory 96 as a new reference position identifier.

Alternatively, the new position identifier can also be taken into the memory 96 from the memory 88 or from the memory 94 without prior confirmation of the new installation position by the user.

In contrast, if the position identifier change has not been confirmed by the user, the safety control device 50 and/or the safety bus component ensures that the safety bus component and/or the control and data-transmission system is moved into a safety state.

It is to be noted that a replacement of a component or the connection of a safety bus component to a different installation location can also be recognized when the position identifiers transmitted to it during first and second communications cycles coincidentally match the reference position identifier stored in the memory 96. In this case, the safety control device 50 can test whether a component exchange has taken place with reference to the serial number or manufacturer identifier transmitted in the safety message from the safety bus component through comparison to the stored configuration datasets.

Because all of the configuration data that describes both the safety and also the non-safety bus components is contained in the Interbus-Master 30, errors can be recognized for a change in the configuration even during a startup of the Interbus transmission system 10.

The invention claimed is:
1. Method for checking the installation location of at least one safety component (60) connected to a control and data-transmission system (10), wherein a non-safety communications control device (30), to which a safety control device (50) is allocated, is connected to the control and data-transmission system, wherein the non-safety communications control device (30) recognizes the position of each connected component in the control and data-transmission system (10), the method comprising:

storing, in the non-safety communications control device (30), a first configuration dataset which contains information on the position of all of the connected components with respect to the control and data-transmission system (10) and an individual position identifier for each safety component (60);

storing, in the safety control device (50), a second configuration dataset which contains a list of only the connected safety components and also an individual position identifier for each safety component;

transmitting, in a first communications cycle, each individual position identifier from the non-safety communications control device (30) to each safety component (60);

transmitting the individual position identifiers contained in the second configuration dataset, in safety messages from the safety control device (50) to the non-safety communications control device (30);

transmitting, in a second communications cycle, the individual position identifiers contained in the received safety messages, from the non-safety communications control device (30) to the corresponding safety components (60);

comparing, at each safety component, the individual position identifiers received in the first and second communications cycles;

if a safety component determines that the individual position identifiers match, testing whether a reference position identifier is stored in the corresponding safety component;

if a reference position identifier is stored in the corresponding safety component, comparing the individual position identifier to the reference position identifier; and if the individual position identifier matches the stored reference position identifier of the corresponding safety component, signaling, via the safety control device (50), that the corresponding safety component is connected at the predetermined installation location.

2. Method according to claim 1, characterized in that the individual position identifier transmitted in the first and/or second communication cycle is stored as a reference position identifier in the corresponding safety component, if a reference position identifier has not yet been stored; that the safety control device (50) receives, from the corresponding safety component, a safety message that contains information on the fact that the position identifiers transmitted in the first and second communication cycles match and that no reference position identifier has yet been stored in the corresponding safety component; and that as a response to the received safety message, the safety control device (50) informs an operator that the position identifiers transmitted in the first and second communications cycles match and that no reference position identifier has yet been stored in the corresponding safety component, and requests the operator to confirm that the corresponding safety component is connected at the predetermined installation location.

3. Method according to claim 1, characterized in that if the individual position identifiers received in the first and second communications cycles match, the reference position identifier stored in the corresponding safety component is compared to the individual position identifier, that if the reference position identifier does not match the individual position identifier, the reference position identifier is overwritten by the individual position identifier, that the corresponding safety component informs, by means of a safety message, the safety control device (50) that the individual position identifiers received in the first and second communications cycles do not match the stored reference position identifier, and that, as a response to the received safety message, the safety control device (50) informs an operator that the position identifiers transmitted in the first and second communications cycles match, but that the position identifiers do not match the reference position identifier in the corresponding safety component, and also requests the operator to confirm that the corresponding safety component is connected at the predetermined installation location.

4. Method according to claim 2, characterized in that the corresponding safety component (60) and/or the control and data-transmission system (10) are moved into a safety state if the operator does not confirm that the corresponding safety component is connected at the predetermined installation location or if the corresponding safety component determines that the individual position identifiers received in the first and second communications cycles do not match.

5. Method according to claim 1, characterized in that the reference position identifier in the corresponding safety component is replaced by the individual position identifier only when the operator has confirmed that the corresponding safety component is connected at the predetermined installation location.

6. Method according to claim 1, characterized in that the control and data-transmission system (10) has a ring-shaped construction.

7. Method according to claim 1, characterized in that the control and data-transmission system (10) contains a field bus (70) according to the Interbus standard, that the first communications cycle is the ID cycle and the second communications cycle is the data cycle of the Interbus protocol, and the individual position identifiers are transmitted at predetermined positions within a summation frame from the non-safety communications control device (30) to the corresponding safety components.

8. Method according to claim 1, characterized in that in the second configuration dataset, at least one component-specific parameter is included for each safety component, and that in the first start-up of the control and data-transmission system or in the replacement of safety components, the safety components transmit at least one component-specific parameter and the serial number in at least one safety message to the safety control device (50), wherein the serial number of the corresponding safety component is fed to the second configuration dataset.

9. Method according to claim 1, characterized in that the safety messages, which come from the safety control device (50) and which contain the individual position identifiers, are forwarded in the second communications cycle from the non-safety communications control device (30) to the corresponding safety components.

10. Control and data-transmission system, comprising:

a transmission device (70), to which at least one non-safety communications control device (30) and at least one safety component (60) are connected, wherein the non-safety communications control device (30) knows the position of each connected component and has a memory device for storing a first configuration dataset, which contains information on the position of all of the connected components with respect to the control and data-transmission system (10) and an individual position identifier for each safety component (60); and a safety control device (50) allocated to the non-safety communications control device (30) with a memory device for storing a second configuration dataset, which contains a list of only the connected safety components and also an individual position identifier for each safety component;

wherein the safety control device (50) is constructed for generating and transmitting a safety message containing the individual position identifier of a safety component (60) to the non-safety communications control device (30), wherein the non-safety communications device (30) is constructed for transmitting individual position identifiers to safety components (60) during a first communications cycle and for transmitting the individual position identifiers received from the safety control device (50) to the safety components (60) during a second communications cycle, wherein each safety component has a memory device (96) for storing a reference position identifier, a device (92) for comparing the individual position identifiers received during the first and second communications cycle, a device for comparing the received individual position identifiers to a reference position identifier, and a device for transmitting at least one safety message to the safety control device, wherein the safety message contains information on the comparison results, and wherein the safety control device (50), as a response to the safety message received from a safety component, requests an operator to confirm that the safety component is connected at the predetermined installation location.

11. Control and data-transmission system according to claim 10, characterized by a device for moving a safety component and/or the control and data-transmission system into a safety state, if the operator does not confirm that the corresponding safety component is connected at the predetermined installation location or if the corresponding safety component determines that the individual position identifiers transmitted in the first and second communications cycles do not match.

12. Control and data-transmission system according to claim 10, characterized in that the safety control device (50) is connected to the non-safety communications control device (30) via a coupling memory (40).

13. Control and data-transmission system according to claim 10, characterized by a programmable control unit (90), which, as a response to the fact that the individual position identifiers transmitted in the first and second communications cycles do not match the reference position identifier stored in the memory device of each of the safety components, causes the corresponding safety component to overwrite the reference position identifier with the individual position identifier.

* * * * *